Figure 1:
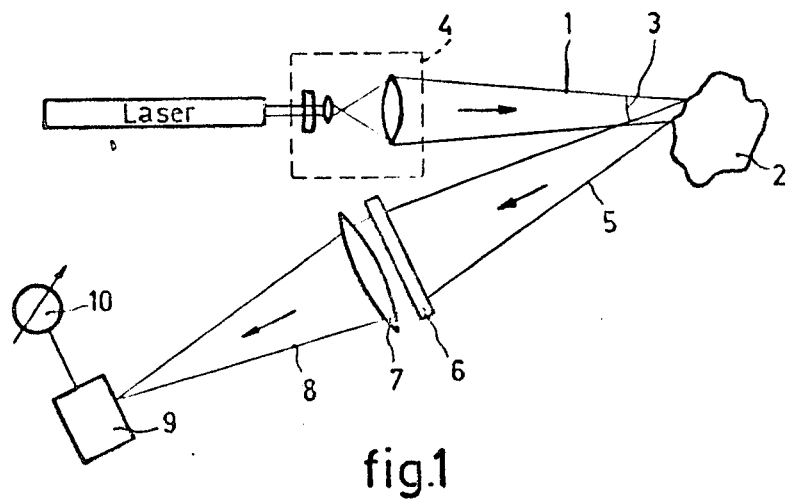

United States Patent
Groh

[15] 3,661,465
[45] May 9, 1972

[54] METHOD AND AN ARRANGEMENT FOR RECOGNIZING AN OBJECT OR ITS POSITION AND ORIENTATION IN SPACE

[72] Inventor: Gunther Groh, Hamburg, Germany
[73] Assignee: U.S. Philips Corporation, New York, N.Y.
[22] Filed: Feb. 6, 1969
[21] Appl. No.: 797,103

[30] Foreign Application Priority Data

Feb. 9, 1968 Germany..................P 16 73 927.8

[52] U.S. Cl..............................356/162, 356/152, 356/172
[51] Int. Cl. ...........................................................G01b 11/00
[58] Field of Search...................356/4, 5, 152, 162, 172, 29, 356/110; 350/3.5

[56] References Cited

UNITED STATES PATENTS 3,388,259  6/1968  Flower....................................356/212
3,490,827  1/1970  Van Ligten et al......................350/3.5

OTHER PUBLICATIONS

Stavis, G., Instruments & Control Systems, Vol. 39, February, 1966, pp. 99–102.
Cutler, C. C., International Science & Tech. 9/63 pp. 54–63.
Martienssen et al., Physics Letters, Vol. 24 A, No. 2, 1/67, pp. 126–8.
Gerritsen et al., Applied Optics, Vol. 7, No. 11, 11/68, pp. 230–2311.
Rosen et al., Applied Physics Letters, Vol. 10, No. 5, 3/67, pp. 140–142.
Collier et al., Applied Physics Letters, Vol. 8, No. 2, 1/66, pp. 44–46.
Ennos, A. E., Contemp. Phys., Vol. 8, No. 2, 3/67, pp. 153–170.
Brooks, R. E., Electronics, 5/67 pp. 88–93.
Gottenberg, W. C., Experimental Mechanics, Vol. 8, 9/68, pp. 405–410.
R. E. Brooks, New Dimensions for Interferometry, Electronics, May 1967.
W. G. Gottenberg, Some Applications of Holographic Interferometry, Experimental Mechanics, Vol. 8, Sept. 1968.

Primary Examiner—Ronald L. Wibert
Assistant Examiner—Jeff Rothenberg
Attorney—Frank R. Trifari

[57] ABSTRACT

A method and apparatus for determining the positional changes in the surface of an object by recording a real image and speckle pattern produced by focusing the radiation scattered by the object from a coherent source, and by comparing the object with the recorded image and the resulting speckle pattern.

9 Claims, 2 Drawing Figures

PATENTED MAY 9 1972 3,661,465

INVENTOR.
GUNTHER GROH
BY
Frank R. Infanti
AGENT

METHOD AND AN ARRANGEMENT FOR RECOGNIZING AN OBJECT OR ITS POSITION AND ORIENTATION IN SPACE

The invention relates to a method of recognizing an object or its position and orientation in space and to arrangements for carrying out the method. Such methods are required, for example, when in manufacture an object after being machined has to be returned to its previous position. In addition, such methods are required in many measuring problems in which for example a change in length, an angular variation or the like is to be measured. Further, the method to be described may be used in analyzing vibrations of bodies and changes of materials.

Several methods of recognizing the position and the orientation of an object in space are known. In the optical methods generally marks suitably made on the object are made to coincide with marks previously made (for example cross hairs) by means of image formation. The position and orientation then are related to these previous marks.

These methods have several disadvantages.

Firstly, they require subjective observation, i.e. an observer has to decide which changes in position and orientation lead to a better and ultimately to the best coincidence of the images and the original marks. Hence, the adjustment cannot readily be automated. In addition, with respect to the adjusting speed and in estimating rapid changes in position and orientation limits are set by the speed of response of the human eye.

Secondly, in positioning with the use of more than one degree of freedom, for example, linear and rotary movements, a corresponding number of reference marks with associated image forming systems are required. The marks made on the object must be made to coincide with the reference marks in several adjusting cycles. A simple indication of the position of the body is not possible.

Thirdly, suitable marks must be made on the object unless this happens to contain sufficiently characteristic structures to be used as targets for adjusting.

These disadvantages of known methods are avoided by the use of the invention. In addition, the method proposed permits further unknown uses.

The method in accordance with the invention is characterized in that the intensity distribution produced by coherent waves being scattered from the object is recorded and stored and in that the intensity distribution as changed by a change in the object or in its position and orientation is compared with the stored distribution.

Since the stored intensity distribution contains the information about the scattering properties of the illuminated parts of the object and about their positions and orientations relative to the incident waves, both the object and its place and orientation are unambiguously determined. In order to recognize an object or its positional coordinates the intensity distribution produced by scattering from the object to be investigated is compared with the stored distribution. The reference system in which the measuring values are determined is defined by the incident waves and by the position and form of the recording device. Hence, the properties of the wave and of the recording device and their relative positions must be maintained constant within the desired measuring accuracy. On the other hand, the reference system as a whole may be arbitrarily moved in space. The position and orientation of the store also is insignificant provided that the store is not identical with, or rigidly connected to, the recording apparatus.

The method may be carried out with any kind of coherent waves (for example, acoustic or electromagnetic waves or corpuscular radiation of widely different wavelengths). In each individual case, there may be optimum adaptation of the method to the respective problem by the choice of the physical nature and the wavelength of the waves used. Therefore, in the following embodiments given by way of example laser radiation is used only for the sake of clarity and the invention is not to be understood to be restricted thereto.

For the uses of the method, two quantities are important: the measuring sensitivity and the measuring range. The latter is determined by that magnitude of the change in the scattering properties or in the position and orientation of the object at which there is, if only just, a measurable correlation between the intensity distribution as stored and as measured, permitting, for example, the object to be moved in the direction of increasing correlation so as to obtain correct positioning of the object. The measuring sensitivity is determined by the magnitude of the change by which the comparing signal responds to incorrect positioning of the object. According to the invention, both magnitudes may be predetermined within wide limits by the choice of the number and of the properties of the irradiating waves (for example their physical nature, wavelength, state of polarization, angle of convergence or divergence, beam diameter). Furthermore, the measuring sensitivity and the measuring range may be influenced in a desirable manner by the formation of certain scattering properties (for example preferred directions, periodic fractions) of the irradiated parts of the object.

A few particular arrangements for carrying out this method will now be described.

In a given arrangement (see FIG. 1, in which only a single beam is shown) one or more laser beams 1 are directed on to the object 2. The angle of convergence 3 and the transverse dimension of the irradiated area may be adjusted by means of an optical system 4, as may be the state of polarization. The intensity distribution of the scattered light 5 due to the characteristic granulation is recorded in a photographic emulsion 6 and after development is stored therein. Since by the photographic process a negative of the intensity distribution is obtained, ideally (i.e. in a linear photographic process) the light 5 scattered from the object 2 is completely intercepted, i.e. the intensity of the transmitted light 8 made to converge, for example, by a lens 7 is a minimum and in the ideal case is zero. A change in the scattering properties of the object or in its position and orientation results in an increase in intensity, which can be measured by means of a photosensitive detector 9 and an indicating device 10. The usual form of the output signal y (intensity) of this cross-correlator measured as a function of a variation x (for example the distance travelled) is shown in FIG. 2. The measuring range 11 is determined by the width of this cross-correlation function and depends not only on the properties of the light and the scattering properties of the object but also on the nature of the change. For example, on irradiation with a collimated laser beam a variation in depth is detected with a sensitivity smaller by several orders of magnitude than is a lateral displacement of the object. In many applications such properties may be utilized. On the other hand, in the embodiment described the sensitivity may be increased by using more than one laser beam or by employing larger angles of convergence.

So far only the natural scattering properties of the object have been used. However, frequently certain portions of the object may be given particularly advantageous scattering properties. It may, for example, readily be ensured that the roughness of the scattering surface has two preferred directions. In this case, the intensity distribution of the scattered light contains, in addition to the usual granulation, a cross pattern of higher luminous intensity, which enables, for example, a rotation of the object to become directly visible. In order to increase the measuring range with constant measuring sensitivity, it may be of advantage to superimpose a periodic fraction on the statistic roughness, for example by ruling a grating on the rough surface. The cross-correlation function of the granulation then also includes a periodic fraction so that the measuring range is increased.

Figure 2:
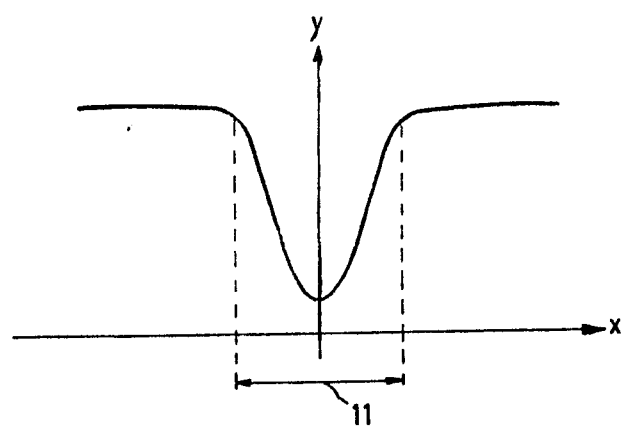

In another arrangement according to the invention the photographic plate 6 shown in FIG. 1 is replaced by the photocathode of a television camera tube, the intensity distribution being stored in a television image store. The changed intensity distribution is compared in an electric or optic correlator. By electric means the difference is more readily formed, an image of the difference being displayed on a monitor for comparison. In addition, the value of the positive portions of the intensity of the difference image averaged over an image may be indicated as a measure of the deviation from the original scattering property or from the position and orientation.

By a person acquainted with the invention the arrangements described may readily be modified so as to deal with the problem to be solved in the respective case.

The invention further permits of carrying out several novel methods which will be described hereinafter.

By way of example, the change in position and orientation of the object or of a part of the object may be measured without physical contact, the transmitter and receiver being measurably displaced in a manner such that optimum correspondence between the intensity distribution as stored and as measured will be produced. For this purpose, any unmachined surface of the body may be used. No additional marks are required, since the granulation (similarly to a finger print) inherently contains the information about the surface element.

Furthermore the method may be used for contactless measurement of vibrations of the object by recording and storing the granulation of the object when stationary and by analyzing variations of the cross-correlation function with time of the object when vibrating.

In a further group of uses the position and orientation of the body remain constant. In these cases, a change in the cross-correlation function or a similar comparison function is produced by a change in the scattering properties of the body. For example, a given object may be recognized amongst similar objects without special marks having to be made on it. In another use, fatique phenomena in stressed materials may be investigated by using the change in the scattering properties of the material as a measure of the fatique. The variation of corrosion or sedimentation phenemena with time may also be tracked at a time at which the image observed under a microscope shows no or very little change, for since the granulation is caused by the interference of the scattered radiation, even slight variations of the optical path length are sufficient to influence the granulation.

In uses based on measurements of the changes in the scattering properties it is of advantage for one or more positional coordinates to be periodically changed by an amplitude exceeding the measuring range 11 which occurs in the respective case or for the laser beam to be correspondingly moved. Thus, a periodic signal at twice the frequency having an amplitude proportional to the maximum correlation is produced at the output of the cross-correlator.

What is claimed is:

1. A method of determining positional changes in the surface of an object, comprising exposing the object surface to coherent radiation to produce a speckle pattern, exposing a light image recording film directly and only to radiation scattered from said object surface to record said speckle pattern thereon, exposing the object a second time to the coherent radiation to produce a second speckle pattern, and comparing the intensity distribution of the recorded speckle pattern with that of the second speckle pattern from the object.

2. A method as claimed in claim 1, wherein the step of comparing the recorded speckle pattern with the second speckle pattern from the object comprises subtracting the recorded light intensity of the image from corresponding portions of the second speckle pattern from the object, and displaying the resultant intensity distribution.

3. A method as claimed in claim 1, wherein the step of comparing the recorded speckle pattern with the second speckle pattern from the object comprises vibrating the object with an amplitude exceeding the positional measuring range.

4. A method as claimed in claim 1, wherein the step of comparing the recorded speckle pattern with the second speckle pattern from the object comprises moving the recorded pattern to a position where the amplitude of the cross-correlation function between the recorded speckle pattern and the second speckle pattern from the object is at a maximum.

5. A method as claimed in claim 1, wherein the step of recording the resultant speckle pattern comprises exposing a photographic emulsion to the speckle pattern, and wherein the step of comparing the recorded speckle pattern with the second speckle pattern from the object comprises imaging the object on the developed negative resulting from the exposure.

6. A device for determining the positional changes in the surface of an object, comprising a source of coherent radiation, means for directing the radiation from the source to the object whereby the radiation is scattered from the object to produce a speckle pattern, a light image recording film located in a plane in space for directly receiving only the radiation scattered from the object, whereby the speckle pattern of the object is recorded on said film, and means for comparing the intensity distribution of the recorded speckle pattern with the intensity distribution of radiation scattered from the object at a later time.

7. A device as claimed in claim 6, wherein the recording film is a photographic emulsion.

8. Apparatus as claimed in claim 7, wherein the means for comparing the recorded speckle pattern with the radiation scattered from the object comprises a photo-sensitive measuring device located on the side of the photographic emulsion opposite the object.

9. A device as claimed in claim 6, further comprising a periodic function on the surface of the object to be measured.

* * * * *

PO-1050
(5/69)

UNITED STATES PATENT OFFICE
CERTIFICATE OF CORRECTION

Patent No. 3,661,465                    Dated May 9, 1972

Inventor(s) GUNTHER GROH

It is certified that error appears in the above-identified patent and that said Letters Patent are hereby corrected as shown below:

Claim 2, line 4, cancel "image" and insert --recorded speckle pattern--.

Signed and sealed this 25th day of July 1972.

(SEAL)
Attest:

EDWARD M. FLETCHER, JR.            ROBERT GOTTSCHALK
Attesting Officer                  Commissioner of Patents